March 14, 1944.  A. A. SCHWARTZ  2,343,875
MACHINE TOOL
Filed Aug. 9, 1941
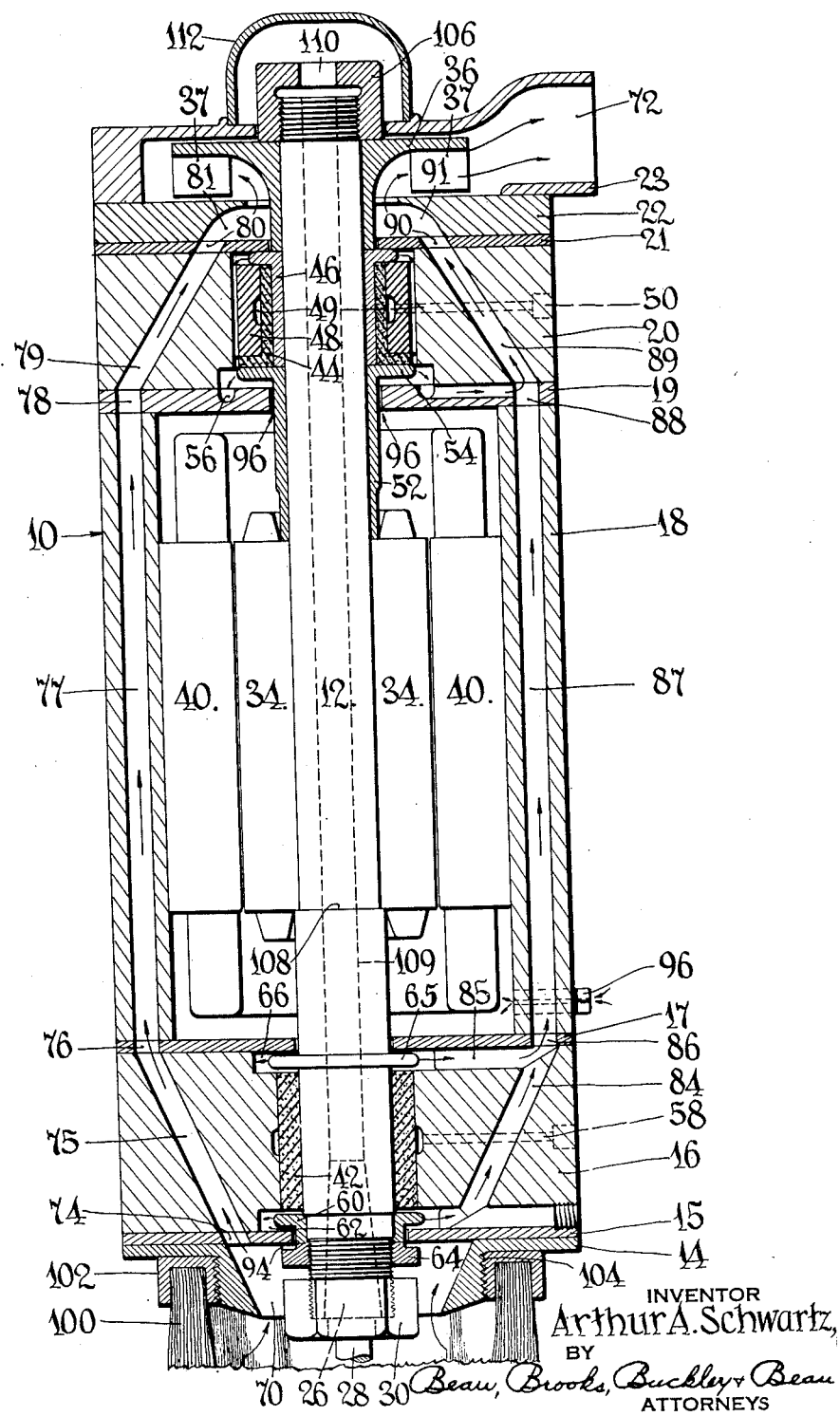
INVENTOR
Arthur A. Schwartz,
BY
Beau, Brooks, Buckley & Beau
ATTORNEYS Patented Mar. 14, 1944

2,343,875

UNITED STATES PATENT OFFICE 2,343,875

MACHINE TOOL

Arthur A. Schwartz, Buffalo, N. Y., assignor to Bell Aircraft Corporation, Buffalo, N. Y.

Application August 9, 1941, Serial No. 406,162

8 Claims. (Cl. 90—11)

This invention relates to machine tools, and more particularly to an improved rotary cutting machine of the so-called router type.

One of the objects of the invention is to provide an improved motor mechanism for driving a routing cutter, or the like. Another object of the invention is to provide an improved cutting device including a self-contained motor unit and an improved lubricating and cooling system therefor. Another object of the invention is to provide an improved routing apparatus whereby chips dislodged from the work piece during operation of the apparatus are disposed of in an improved manner. Another object of the invention is to provide an improved routing machine which is capable of continuous operation in an improved manner. Other objects and advantages of the invention will appear in the specification hereinafter.

The drawing is a vertical sectional view through a router machine of the invention. The machine of the drawing includes a generally tubular housing 10 which is fabricated by assembly of a plurality of body portions in longitudinally aligned relationship, so as to provide a unitary housing structure substantially enclosing a cutter spindle 12. Thus, the housing 10 comprises a series of ten superposed housing sections which are designated in the drawing by the numerals 14—15—16—17—18—19—20—21—22 and 23. It will be understood that the housing sections 14 to 23, inclusive, are all centrally bored to accommodate the rotating elements of the mechanism, and are connected in assembled relation by means of any suitable tie-bolts or other connection devices (not shown).

At its lower end the spindle 12 is taper bored to receive a reversely tapered enlarged end portion 26 of the shank of a cutting tool which is designated at 28. A lock nut or gland 30 is arranged to be mounted in screwthreaded relation upon the lower end of the spindle 12 so as to clamp the tapered end portion of the tool into the spindle bore for driving connection therebetween. Intermediately of its ends the spindle 12 carries in keyed relation thereon the rotor winding elements 34 of an electric motor organization; and adjacent its upper end the spindle 12 carries a turbine fan rotor 36 having blades 37 extending radially of the axis of rotation of the spindle 12. The central housing section 18 encloses the spindle 12 in the region of the windings 34 and mounts therewithin the stator winding elements 40 of the electric motor organization referred to hereinabove. It will be understood that the outer and inner contours of the winding elements 34—40, respectively, will be complementary and co-concentric of the axis of rotation of the spindle 12, and that the necessary electric motor elements accessory to the stator and rotor winding portions illustrated herein will be mounted upon the device in accord with usual motor practice to complete the motor mechanism whereby upon excitation of the stator windings 40 the spindle 12 will be caused to rotate within the housing. To accommodate rotation of the spindle 12 the housing section 16 is fitted with a sleeve bearing 42 to engage the lower end of the spindle 12, and the housing section 20 is fitted with a sleeve bearing 44 to engage a cylindrical liner 46 which is press-fitted or otherwise keyed to the spindle 12 adjacent its upper end.

A cylindrical collar 48 is keyed to the housing section 20 to back up the bearing collar 44, and an oil supply duct 49 leads through the housing section 20 from exteriorly thereof into communication with the rear surface of the bearing collar 44 for conveying a continuous supply of oil under pressure to the rear surface of the bearing collar. A connection port 50 is arranged at the outer surface of the housing section 20 in communication with the duct 49 for connection with any suitable oil pressure supply device. The bearing collar 44 is formed of a porous metallic structure, whereby the oil under pressure delivered through the duct 49 is enabled to feed through the body of the bearing collar 44 so as to lubricate the relatively moving surfaces of the liner 46 and the bearing 44. A collar 52 having a radially extending flange portion 54 is carried by the spindle 12 below the liner 46 and in close fitting relation thereagainst so as to function as a slinger ring for discharging centrifugally the oil moving downwardly between the bearing surfaces into an annularly grooved portion 56 of the housing section 19, so as to divert the oil from movement downwardly into contact with the motor windings 34—40.

The housing section 16 is also provided with an oil supply duct 58 for feeding oil under pressure from a suitable outside source against the rear surface of the bearing sleeve 42 at the lower end of the machine spindle. A slinger ring 60 is carried by the spindle 12 adjacent the lower end of the bearing 42 for centrifugally discharging the oil draining from the bearing 42 into a circular chamber portion 62 of the housing section 16. A lock nut 64 maintains the slinger ring 60 in position. An annulus 65 is similarly carried by the spindle 12 above the position of the bearing 42 for centrifugally discharging oil coming into contact therewith into a second circular chamber 66 of the housing section 16.

The housing section 14 is centrally apertured as indicated at 70 to accommodate free movement of air from externally of the machine and into the lower portion thereof in the region of the spindle 12, and series of intercommunicating passageways are provided through all of the housing sections so as to permit rotation of the fan blades 37 to induce a rapid flow of air into the machine through the port 70 and upwardly through the housing structure thereof and thence through the turbine device for discharge through a port 72 formed in a side wall portion of the upper housing section 23. For this purpose the housing section 15 is perforated at 74; the housing section 16 is perforated at 75; the housing section 17 is perforated at 76; the housing section 18 is perforated at 77; the housing section 19 is perforated at 78; the housing section 20 is perforated at 79; the housing section 21 is perforated at 80; and the housing section 22 is perforated at 81. It will be understood that the series of perforations through the various housing sections may be repeated radially of the housing structure any desired number of times so that sufficient cross sectional area of air passageway space will be provided to cause adequate cooling of the operative elements of the machine.

At one or more positions spaced radially of the air passageway portions of the housing structure, the housing sections are provided with one or more series of intercommunicating passageways for conveying oil discharged through the bearings of the machine into the influence of the turbine 36 for subsequent discharge through the outlet port 72. For this purpose the housing section 16 is perforated at 84 in communication with the circular chamber 62 and at 85 in communication with the circular chamber 66. From thence the oil conveying passageway includes a perforated portion 86 through the housing section 17; a perforated portion 87 through the housing section 18; a perforated portion 88 through the housing section 19 in communication with the annular chamber 56 thereof; a preforated portion 89 of the housing section 20; a perforated portion 90 of the housing section 21; and a perforated portion 91 of the housing section 22.

The housing sections 15 and 19 are loosely fitted to the adjacent spindle carried structures so as to provide fluid transmission spaces at 94 and 96 respectively. Thus, suction forces created by the turbine 36 which act through the oil conveying passageway illustrated at the right hand side of the housing structure are enabled to cause a slight in-drawing of air at 94 between the spindle and the housing structure whereby an up-draft is created within the oil conveying passageway system. An air inlet port 98 is provided to extend through the housing section 18 at the lower end thereof so as to admit intake of a supply of fresh cooling air to be drawn upwardly through the region of the motor winding elements 34—40 and thence through the passageway 96 and into the oil conveying duct system for discharge through the outlet port 72. Thus, it will be understood that the turbine 36 is adapted to discharge a continuous stream of air and oil from the air and oil passageways through the outlet port 72, and that due to the rapid operation of the machine and the relatively small amount of oil transmitted thereby in relation to the amount of air circulating therethrough, the oil will become finely divided and the discharge from the outlet port 72 will appear in the form of a mist of oil.

To control the movement of chips or other cutting debris in connection with the operation of the cutting tool element, an annular curtain of bristles 100 is arranged to extend below the level of the housing structure 10 for a distance sufficient to engage the upper surface of the work piece being acted upon by the machine. The bristles 100 will preferably be formed of some suitable resilient substance such as a synthetic resin product known commercially as "nylon," or any other suitable natural or synthetic material. The bristles 100 are carried by an annulus 102 which is screwthreaded to the housing section 14 as at 104. Being flexible, the bristles 100 will accommodate the machine to use under conditions of different spacings between the lower face portion of the housing section 14 and the work piece, and the bristles 100 will not function to obstruct the passage of air from externally of the machine into the region surrounding the cutting tool for transmission upwardly through the passageway ducts of the housing structure. However, the curtain of bristles 100 will function effectively to obstruct the flying of chips or other debris from the situs of the cutting operation for the protection of the operator.

It will be understood that the relatively heavier chips or debris from the cutting operation will simply accumulate upon the surface of the work piece interiorly of the curtain 100, from which they may be periodically removed by the machine attendant. However, the finer chips and debris will be automatically sucked upwardly through the air passageway ducts of the housing structure and discharged by the turbine 36 through the outlet port 72. It is contemplated that the discharge products emanating from the outlet port 72 may be conducted to any suitable separator device so that the oil ingredients thereof may be recovered for reuse, and so that the chips or other solid particles thereof may be recovered if desired.

A lock nut 106 is provided to engage upon the upper end of the spindle 12 to maintain the upper portion of the spindle-carried assembly in assembled relation. The spindle is shouldered at 108 to provide an abutment against which the winding element 34 is clamped by means of the sleeve 52. In turn, the sleeve 52 is maintained in proper longitudinal position upon the spindle by means of the liner 46 which is braced against the turbine 36 at its upper end. The spindle 12 is centrally bored at 109 to accommodate insertion of a rod therethrough for driving the cutting tool 28 from the spindle during tool replacement processes. For the same purpose the lock nut 106 is centrally bored at 110. A detachable cover cap 112 completes the enclosure of the tool housing, and permits convenient changing of tools as explained hereinabove.

It will be understood that the invention thus provides a self-contained cutting spindle and housing structure wherein the driving motor elements are mounted and arranged in an improved manner and wherein improved means for circulating cooling air and lubricating oil are provided. Also, the mechanism provides important improvements with respect to the control of the chips or other debris emanating from the cutting operation of the machine, and although only one form of the invention has been shown and described in detail it will be apparent to those skilled in the art that the invention is not so limited but that various changes may be made therein without departing from the spirit of the invention or the scope of the appended claims.

I claim:

1. A machine tool including a housing, a spindle extending interiorly of said housing and mounted thereon by means of spaced bearings, electro-motive armature elements mounted concentrically upon said spindle between the positions of said spaced bearings, electro-motive field elements mounted upon said housing so as to substantially encompass said armature elements whereby upon rotation of said spindle said armature elements revolve in close proximity within said field elements, a cutting tool mounted upon one end of said spindle so as to extend beyond said housing into work piece cutting position, turbine means carried by the opposite end of said spindle for discharging vapor externally of said housing, and said housing being perforated to provide air passageways therethrough leading from the region of said cutting tool and extending through said housing in close proximity with said field elements and thence into communication with said turbine means, means supplying a continuous feed of lubricating oil to said bearings, and duct means within said housing for conveying oil exiting from said bearings into communication with said turbine means.

2. A machine tool including a housing, a spindle extending interiorly of said housing and mounted thereon by means of spaced bearings, electro-motive armature elements mounted upon said spindle between the positions of said spaced bearings, electro-motive field elements mounted upon said housing so as to substantially encompass said armature elements whereby upon rotation of said spindle said armature elements revolve in close proximity within said field elements, a cutting tool mounted upon one end of said spindle so as to extend beyond said housing into work piece cutting position, turbine means carried by the opposite end of said spindle for discharging vapor externally of said housing, said housing being perforated to provide air passageways therethrough leading from the region of said cutting tool and extending through said housing in close proximity with said field elements and thence into communication with said turbine means, and oil circulating duct means for conveying a continuous supply of lubricating oil to said bearings and from thence into said turbine means.

3. A machine tool including a housing, a spindle extending interiorly of said housing and mounted thereon by means of spaced bearings, electro-motive armature elements mounted upon said spindle between the positions of said spaced bearings, electro-motive field elements mounted upon said housing so as to substantially encompass said armature elements whereby upon rotation of said spindle said armature elements revolve in close proximity within said field elements, a cutting tool mounted upon one end of said spindle so as to extend beyond said housing into work piece cutting position, turbine means carried by the opposite end of said spindle for discharging vapor externally of said housing, said housing being perforated to provide air passageways therethrough leading from the region of said cutting tool and extending through said housing in close proximity with said field elements and thence into communication with said turbine means, said housing being formed with oil inlet ducts leading from externally of said housing into communication with said bearings and a second series of passageways leading through said housing from the region of said cutting tool into communication with said turbine means and communicating intermediately thereof with said bearings whereby rotation of said spindle causes said turbine means to create an atmosphere flow from the region of said cutting tool through said passageways for cooling said housing and for picking up oil discharging from said bearings for conveyance into said turbine means for discharge externally of said housing.

4. A machine tool including a housing, a spindle extending interiorly of said housing and mounted thereon by means of spaced bearings formed of porous substances, electro-motive armature elements mounted upon said spindle between the positions of said spaced bearings, electro-motive field elements mounted upon said housing so as to substantially encompass said armature elements whereby upon rotation of said spindle said armature elements revolve in close proximity within said field elements, a cutting tool mounted upon one end of said spindle so as to extend beyond said housing into work piece cutting position, turbine means carried by the opposite end of said spindle for discharging vapor externally of said housing, said housing being perforated to provide air passageways therethrough leading from the region of said cutting tool and extending through said housing in close proximity with said field elements and thence into communication with said turbine means, said housing being formed with oil inlet ducts leading from externally of said housing into communication with back portions of said bearings and a second series of passageways leading through said housing from the region of said cutting tool into communication with said turbine means and communicating intermediately thereof with reservoir portions of said housing below said bearings whereby rotation of said spindle causes said turbine means to create an atmosphere flow from the region of said cutting tool through said passageways for cooling said housing and for picking up oil discharging through said bearings for conveyance thereof into said turbine means for discharge externally of said housing.

5. A machine tool including a housing, a spindle extending interiorly of said housing and mounted thereon by means of spaced perforate bearings, electro-motive armature elements mounted upon said spindle between the positions of said spaced bearings, electro-motive field elements mounted upon said housing so as to substantially encompass said armature elements whereby upon rotation of said spindle said armature elements revolve in close proximity within said field elements, a cutting tool mounted upon one end of said spindle so as to extend beyond said housing into work piece cutting position, turbine means carried by the opposite end of said spindle for discharging vapor externally of said housing, annular flange means carrier by said spindle below the position of each of said bearings, said housing being perforated to provide air passageways therethrough leading from the region of said cutting tool and extending through said housing in close proximity with said field elements and thence into communication with said turbine means, said housing being formed with oil inlet ducts leading from externally of said housing into communication with back portions of said bearings and a second series of passageways leading through said housing from the region of said cutting tool into communication with said turbine means and communicating intermediately thereof with portions of said housing enclosing said annular flange means whereby rotation of said spindle causes said turbine means to create an atmosphere flow from the region of said cutting tool through passageways for cooling said housing and for picking up oil circulating through said bearings for conveyance thereof into said turbine means for discharge externally of said housing.

6. A machine tool including a housing, a spindle extending interiorly of said housing and mounted thereon by means of spaced perforate bearings, electro-motive armature elements mounted upon said spindle between the positions of said spaced bearings, electro-motive field elements mounted upon said housing so as to substantially encompass said armature elements whereby upon rotation of said spindle said armature elements revolve in close proximity within said field elements, a cutting tool mounted upon one end of said spindle so as to extend beyond said housing into work piece cutting position, turbine means carried by the opposite end of said spindle for discharging vapor externally of said housing, annular flange means carried by said spindle below the position of each of said bearings, said housing being perforated to provide air passageways therethrough leading from the region of said cutting tool and extending through said housing in close proximity with said field elements and thence into communication with said turbine means, said housing being formed with oil inlet ducts leading from externally of said housing into communication with back portions of said bearings and a second series of passageways leading through said housing from the region of said cutting tool into communication with said turbine means and communicating intermediately thereof with portions of said housing enclosing said annular flange means whereby rotation of said spindle causes said turbine means to create an atmosphere flow from the region of said cutting tool through said passageways for cooling said housing and for picking up oil circulating through said bearings for conveyance thereof into said turbine means for discharge externally of said housing and a curtain of flexible bristle-like members mounted to extend from the cutting tool end of said housing to encircle the work piece cutting region for preventing flying of chips without stoppage of air flow into said passageways.

7. A machine tool including a housing, a spindle extending interiorly of said housing and mounted thereon by means of spaced perforated bearings, electro-motive armature elements mounted upon said spindle between the positions of said spaced bearings, electro-motive field elements mounted upon said housing so as to substantially encompass said armature elements whereby upon rotation of said spindle said armature elements revolve in close proximity within said field elements, a cutting tool mounted upon one end of said spindle so as to extend beyond said housing into work piece cutting position, turbine means carried by the opposite end of said spindle for discharging vapor externally of said housing, annular flange means carried by said spindle below the position of each of said bearings, said housing being perforated to provide air passageways therethrough leading from the region of said cutting tool and extending through said housing in close proximity with said field elements and thence into communication with said turbine means, said housing being formed with oil inlet ducts leading from externally of said housing into communication with back portions of said bearings and a second series of passageways leading through said housing from the region of said cutting tool into communication with said turbine means and communicating intermediately thereof with portions of said housing enclosing said annular flange means whereby rotation of said spindle causes said turbine means to create at atmosphere flow from the region of said cutting tool through said passageways for cooling said housing and for picking up oil circulating through said bearings for conveyance thereof into said turbine means for discharge externally of said housing and a curtain of flexible bristle-like members mounted to extend from the cutting tool end of said housing to encircle the work piece cutting region for preventing flying of chips without stoppage of air flow into said passageways whereby said means is adapted to induce flow of cooling air and discharged oil and work piece chips through said passageways and into said turbine for discharge externally of said housing.

8. A machine tool including a housing, a spindle extending interiorly of said housing and mounted thereon by means of spaced perforate bearings, electro-motive armature elements mounted upon said spindle between the positions of said spaced bearings, electro-motive field elements mounted upon said housing so as to substantially encompass said armature elements whereby upon rotation of said spindle said armature elements revolve in close proximity within said field elements, a cutting tool mounted upon one end of said spindle so as to extend beyond said housing into work piece cutting position, turbine means carried by the opposite end of said spindle for discharging vapor externally of said housing, annular flange means carried by said spindle below the position of each of said bearings, said housing being perforated to provide air passageways therethrough leading from the region of said cutting tool and extending through said housing in close proximity with said field elements and thence into communication with said turbine means, said housing being formed with oil inlet ducts leading from externally of said housing into communication with back portions of said bearings and a second series of passageways leading through said housing from the region of said cutting tool into communication with said turbine means and communicating intermediately thereof with portions of said housing enclosing said annular flange means whereby rotation of said spindle causes said turbine means to create an atmosphere flow from the region of said cutting tool through said passageways for cooling said housing and for picking up oil circulating through said bearings for conveyance thereof into said turbine means for discharge externally of said housing, said second series of passages having more constricted communication with the region of the cutting tool than said first mentioned passageways.

ARTHUR A. SCHWARTZ.